(12) United States Patent
Onishi et al.

(10) Patent No.: US 11,109,183 B2
(45) Date of Patent: Aug. 31, 2021

(54) VEHICLE MANAGEMENT DEVICE, VEHICLE MANAGEMENT METHOD, AND PROGRAM

(71) Applicant: Komatsu Ltd., Tokyo (JP)

(72) Inventors: Yoshiyuki Onishi, Tokyo (JP); Yuuichi Nemoto, Tokyo (JP)

(73) Assignee: Komatsu LTD., Tokyo (JP)

( * ) Notice: Subject to any disclaimer, the term of this patent is extended or adjusted under 35 U.S.C. 154(b) by 0 days.

(21) Appl. No.: 16/606,805

(22) PCT Filed: Jun. 28, 2018

(86) PCT No.: PCT/JP2018/024610
§ 371 (c)(1),
(2) Date: Oct. 21, 2019

(87) PCT Pub. No.: WO2019/013008
PCT Pub. Date: Jan. 17, 2019

(65) Prior Publication Data
US 2020/0382898 A1 Dec. 3, 2020

(30) Foreign Application Priority Data
Jul. 14, 2017 (JP) .............................. JP2017-138222

(51) Int. Cl.
*H04W 4/00* (2018.01)
*H04W 4/021* (2018.01)
(Continued)

(52) U.S. Cl.
CPC ........... *H04W 4/021* (2013.01); *H04W 4/027* (2013.01); *H04W 4/029* (2018.02); *H04W 4/40* (2018.02)

(58) Field of Classification Search
CPC ...... H04L 67/18; H04L 63/0428; H04W 4/24; H04W 4/70; H04W 12/06; H04W 4/21; H04W 4/024
(Continued)

(56) References Cited

U.S. PATENT DOCUMENTS 6,791,475 B2 * 9/2004 Yamashita ........... G07B 15/063
235/384
7,504,932 B2 * 3/2009 Bartels .................. G01S 13/931
340/435
(Continued)

FOREIGN PATENT DOCUMENTS

CN 102194327 A 9/2011
CN 202600978 U 12/2012
(Continued)

OTHER PUBLICATIONS

SoCar: A Social Car2Car Framework to Refine Routes Information Based on Road Events and GPS by Walter Balzano et al, Published in: 2015 IEEE International Conference on Computerand Information Technology; Ubiquitous Computing and Communications; Dependable, Autonomic and Secure Computing; Oct. 2015 (Year: 2015).*
(Continued)

*Primary Examiner* — William D Cumming
(74) *Attorney, Agent, or Firm* — Locke Lord LLP

(57) ABSTRACT

An entry direction determination unit determines whether or not an entry direction of a vehicle into an output determination region is a predetermined direction in a case where the vehicle is located in a predetermined region or at a predetermined point. An output unit determines whether or not predetermined information is to be output on the basis of whether or not the entry direction is the predetermined direction.

17 Claims, 17 Drawing Sheets

(51) Int. Cl.
*H04W 4/029* (2018.01)
*H04W 4/02* (2018.01)
*H04W 4/40* (2018.01)

(58) Field of Classification Search
USPC ............................ 455/456.3; 340/435, 935
See application file for complete search history.

(56) References Cited

U.S. PATENT DOCUMENTS

| | | | | |
|---|---|---|---|---|
| 9,378,602 | B2* | 6/2016 | Ricci | B60R 25/102 |
| 9,919,644 | B2* | 3/2018 | Meinzer | B60Q 1/0076 |
| 10,013,878 | B2* | 7/2018 | Ricci | G06F 3/0622 |
| 10,434,932 | B2* | 10/2019 | Goeke | F21S 41/151 |
| 2002/0145542 | A1* | 10/2002 | Yamashita | G08G 1/056 |
| | | | | 340/935 |
| 2012/0265371 | A1 | 10/2012 | Buschmann et al. | |
| 2013/0141581 | A1 | 6/2013 | Mitsuta et al. | |
| 2014/0019042 | A1 | 1/2014 | Sugawara et al. | |
| 2014/0287779 | A1* | 9/2014 | O'Keefe | H04W 4/024 |
| | | | | 455/456.3 |
| 2014/0309815 | A1* | 10/2014 | Ricci | B60H 1/00742 |
| | | | | 701/2 |
| 2014/0309839 | A1* | 10/2014 | Ricci | G07C 5/0833 |
| | | | | 701/25 |
| 2014/0309913 | A1* | 10/2014 | Ricci | G01C 21/3691 |
| | | | | 701/117 |
| 2015/0032373 | A1* | 1/2015 | Ikari | G08G 1/00 |
| | | | | 701/517 |
| 2016/0059771 | A1* | 3/2016 | Meinzer | B60Q 1/323 |
| | | | | 362/464 |
| 2016/0155326 | A1* | 6/2016 | Ricci | A61B 5/4809 |
| | | | | 701/117 |
| 2016/0313730 | A1* | 10/2016 | Ricci | B60C 1/00 |
| 2016/0347323 | A1* | 12/2016 | Yoshitomi | B60W 40/04 |
| 2017/0028876 | A1* | 2/2017 | Yamada | B60N 2/06 |
| 2017/0131712 | A1* | 5/2017 | Ricci | B60W 50/14 |
| 2018/0236929 | A1* | 8/2018 | Gocke | F21S 41/143 |
| 2020/0382898 | A1* | 12/2020 | Onishi | H04W 4/021 |
| 2021/0070302 | A1* | 3/2021 | Yu | B60W 30/16 |

FOREIGN PATENT DOCUMENTS

| | | |
|---|---|---|
| CN | 103098112 A | 5/2013 |
| JP | 2002-078015 A | 3/2002 |
| JP | 3802503 B2 * | 7/2006 |
| JP | 3802503 B2 * | 7/2006 |
| JP | 2007-024772 A | 2/2007 |
| JP | 2008-071008 A | 3/2008 |
| JP | 2009-236522 A | 10/2009 |
| JP | 2013-166425 A | 8/2013 |
| JP | 2013-250854 A | 12/2013 |
| JP | 2016-181169 A | 10/2016 |

OTHER PUBLICATIONS

Information Technology of Motor Vehicle Databases Use to Prevent Terrorist Emergencies by Yuliia Honcharenko Kyiv, Ukraine; ; Natalia Kasatkina; Yurii Maslyiak; Bogdan Maslyiak; Lyudmyla Honchar Published in: 2020 10th International Conference on Advanced Computer Information Technologies Sep. 2020 (Year: 2020).*

* cited by examiner

FIG. 3

| RECORD ID | TYPE OF OUTPUT | CONTENT OF INFORMATION | OUTPUT DETERMINATION REGION | | DIRECTION DETERMINATION REGION | | DISPLAY REGION | | ID OF WORK MACHINE |
|---|---|---|---|---|---|---|---|---|---|
| | | | CENTER COORDINATE | DIAMETER | CENTER COORDINATE | DIAMETER | CENTER COORDINATE | DIAMETER | |
| R1 | OUTPUT TO WORK MACHINE | DUMP TRUCK IS APPROACHING EARTH CUT LOCATION | X11, Y11 | D11 | X12, Y12 | D12 | X13, Y13 | D13 | A, B |
| R2 | UPDATE OF STATUS | LOADED TRAVELING | X21, Y21 | D21 | X22, Y22 | D22 | X23, Y23 | D23 | — |
| ⋮ | ⋮ | ⋮ | ⋮ | ⋮ | ⋮ | ⋮ | ⋮ | ⋮ | ⋮ |

FIG. 4

| TRUCK ID | RECORD ID | ENTRY TIME |
|---|---|---|
| T1 | R2 | yyyy/mm/dd hh:mm:ss |
| T2 | R1 | yyyy/mm/dd hh:mm:ss |
| ⋮ | ⋮ | ⋮ |

FIG. 5

| WORK TYPE | WORK AMOUNT |
|---|---|
| LOADING | 100m$^3$ |
| UNLOADING | 200m$^3$ |

FIG. 6

| TRUCK ID | STATUS |
|---|---|
| T1 | LOADED TRAVELING |
| T2 | UNLOADED TRAVELING |
| ⋮ | ⋮ |

FIG. 11

| RECORD ID | TYPE OF OUTPUT | CONTENT OF INFORMATION | DETERMINATION REGION | | | | DISPLAY REGION | | ID OF WORK MACHINE |
|---|---|---|---|---|---|---|---|---|---|
| | | | CENTER COORDINATE | DIAMETER | FIRST AZIMUTH | SECOND AZIMUTH | CENTER COORDINATE | DIAMETER | |
| R1 | OUTPUT TO WORK MACHINE | DUMP TRUCK IS APPROACHING EARTH CUT LOCATION | X11, Y11 | D11 | d11 | d12 | X13, Y13 | D13 | A, B |
| R2 | UPDATE OF STATUS | LOADED TRAVELING | X21, Y21 | D21 | d21 | d22 | X23, Y23 | D23 | — |
| ⋮ | ⋮ | ⋮ | ⋮ | ⋮ | ⋮ | ⋮ | ⋮ | ⋮ | ⋮ |

FIG. 16

| RECORD ID | TYPE OF OUTPUT | CONTENT OF INFORMATION | OUTPUT DETERMINATION REGION ||| DISPLAY REGION || WORK MACHINE ID |
|---|---|---|---|---|---|---|---|---|
| | | | CENTER COORDINATE | DIAMETER | ENTRY DIRECTION | CENTER COORDINATE | DIAMETER | |
| R1 | OUTPUT TO WORK MACHINE | DUMP TRUCK IS APPROACHING EARTH CUT LOCATION | X11, Y11 | D11 | d11 | X13, Y13 | D13 | A, B |
| R2 | UPDATE OF STATUS | LOADED TRAVELING | X21, Y21 | D21 | d21 | X23, Y23 | D23 | — |
| ⋮ | ⋮ | ⋮ | ⋮ | ⋮ | ⋮ | ⋮ | ⋮ | ⋮ |

VEHICLE MANAGEMENT DEVICE, VEHICLE MANAGEMENT METHOD, AND PROGRAM

TECHNICAL FIELD

The present invention relates to a vehicle management device, a vehicle management method, and a program.

Priority is claimed on Japanese Patent Application No. 2017-138222, filed on Jul. 14, 2017, the content of which is incorporated herein by reference.

BACKGROUND ART

As disclosed in PTL 1, there is a method using a geofence as a method in which a computer outputs notification information on the basis of a position. For example, a computer such as a portable terminal defines a geofence which is a virtual region on a map in advance, determines whether or not the computer is located in the geofence, and outputs notification information in a case where the computer is located in the geofence.

CITATION LIST

Patent Literature

[PTL 1] Japanese Unexamined Patent Application, First Publication No. 2008-071008

SUMMARY OF INVENTION

Technical Problem

In a case where a geofence is set to be small, a traveling vehicle already passes through the geofence during an interval of acquiring position data, and thus there is a probability that notification information may not be output. Thus, a size of a geofence is required to be set according to an acquisition interval for position data and a speed of a vehicle.

Thus, for example, in a case where notification information is desired to be output to only a vehicle traveling on one lane of a two-lane road, or a case where notification information is desired to be output to only a vehicle traveling on a road after returning at a hairpin curve, it is difficult to selectively output information to a vehicle traveling on a plurality of adjacent roads of which passage directions are different from each other.

Aspects of the present invention are directed to providing a vehicle management device, a movement management method, and a program capable of appropriately outputting information even though there is a road with a different passage direction in the vicinity of a road including a location where the information is to be output.

Solution to Problem

According to a first aspect of the present invention, there is provided a vehicle management device including an entry direction determination unit that determines whether or not an entry direction of a vehicle into a predetermined region or a predetermined point is a predetermined direction in a case where the vehicle is located in the predetermined region or at the predetermined point; and a notification information output unit that determines whether or not predetermined information is to be output on the basis of whether or not the entry direction is the predetermined direction.

Advantageous Effects of Invention

According to at least one of the aspects, the vehicle management device can appropriately output information even though there is a road with a different passage direction in the vicinity of a road including a location where the information is to be output.

BRIEF DESCRIPTION OF DRAWINGS

FIG. 3 is a diagram showing an example of information stored in a region storage unit according to the first embodiment.

FIG. 4 is a diagram showing an example of information stored in an entry storage unit according to the first embodiment.

FIG. 5 is a diagram showing an example of information stored in a work amount storage unit according to the first embodiment.

FIG. 6 is a diagram showing an example of information stored in a status storage unit according to the first embodiment.

FIG. 11 is a diagram showing an example of information stored in a region storage unit according to a second embodiment.

FIG. 16 is a diagram showing an example of information stored in a region storage unit according to the fourth embodiment.

DESCRIPTION OF EMBODIMENTS

First Embodiment

<<Construction Site>>

Figure 1:
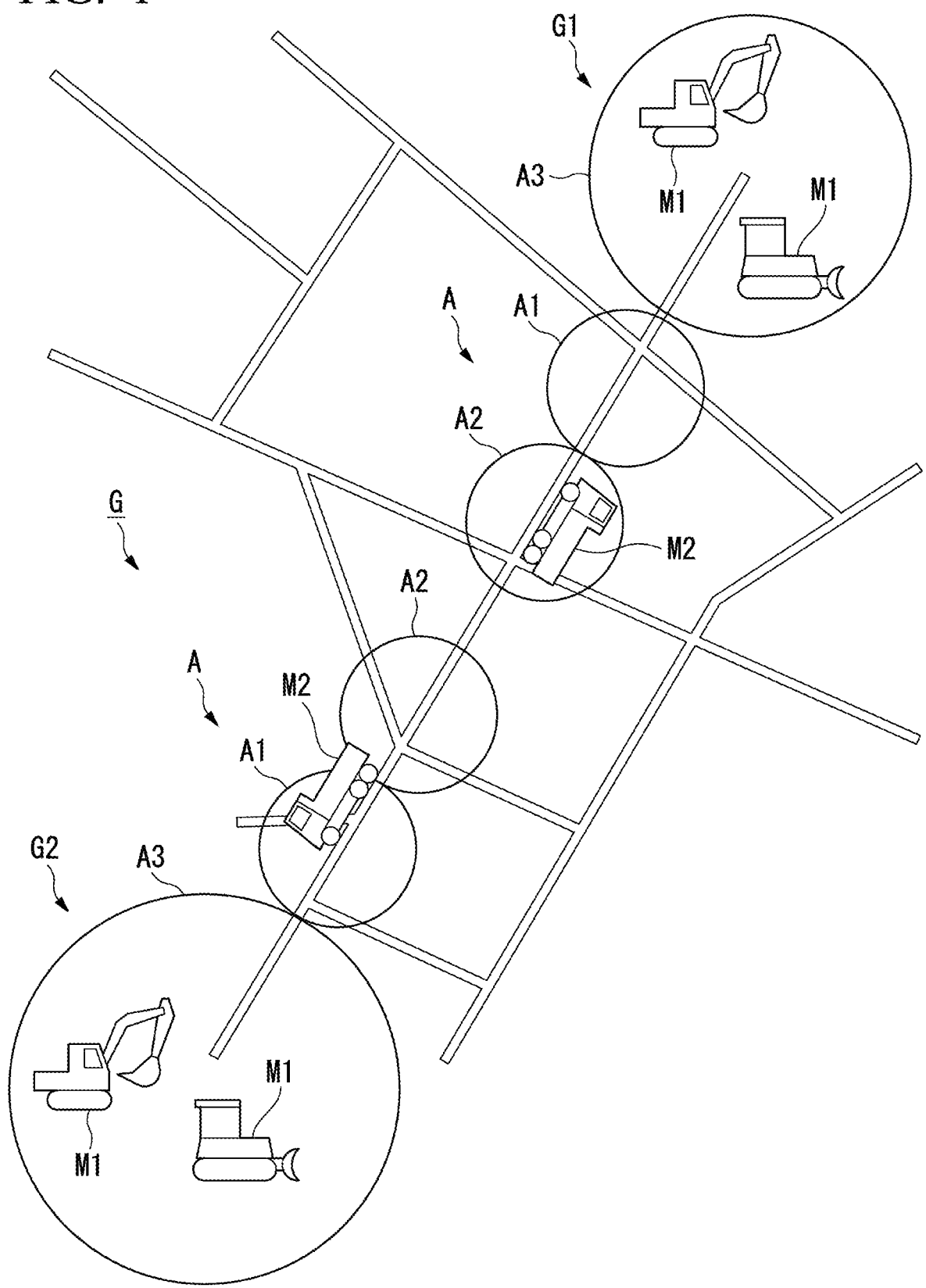
FIG. 1 is a diagram showing an example of a construction site which is a management target of a vehicle management device according to a first embodiment.

FIG. 1 is a diagram showing an example of a construction site which is a management target of a vehicle management device according to a first embodiment.

A construction site G according to the first embodiment has an earth cut location G1 and a banking location G2. The earth cut location G1 and the banking location G2 are connected to each other via a general road. Work machines M1 are disposed in each of the earth cut location G1 and the banking location G2. The work machines M1 perform excavation, banking, transport of earth and sand, ground shaping, ground compaction, and the like.

Examples of the work machines M1 include a hydraulic excavator, a bulldozer, a wheel loader, and a road roller. In the construction site G, dump trucks M2 travel between the earth cut location G1 and the banking location G2. The dump trucks M2 transport earth and sand excavated in the earth cut location G1, to the banking location G2.

A computer is mounted or carried on each of the work machines M1 and the dump trucks M2. An example of the carried computer may include a smart phone. Hereinafter, a computer mounted or carried on the work machine M1 will be referred to as a computer of the work machine M1. A computer mounted or carried on the dump truck M2 will be referred to as a computer of the dump truck M2. The computer of the dump truck M2 has a position data acquisition function. The computer of the dump truck M2 acquires position data by using, for example, a global navigation satellite system (GNSS) such as a global positioning system (GPS), an access spot of a wireless local area network (LAN), or a signal based on Bluetooth (registered trademark), or a combination thereof.

<<Vehicle Management Device>>

Figure 2:
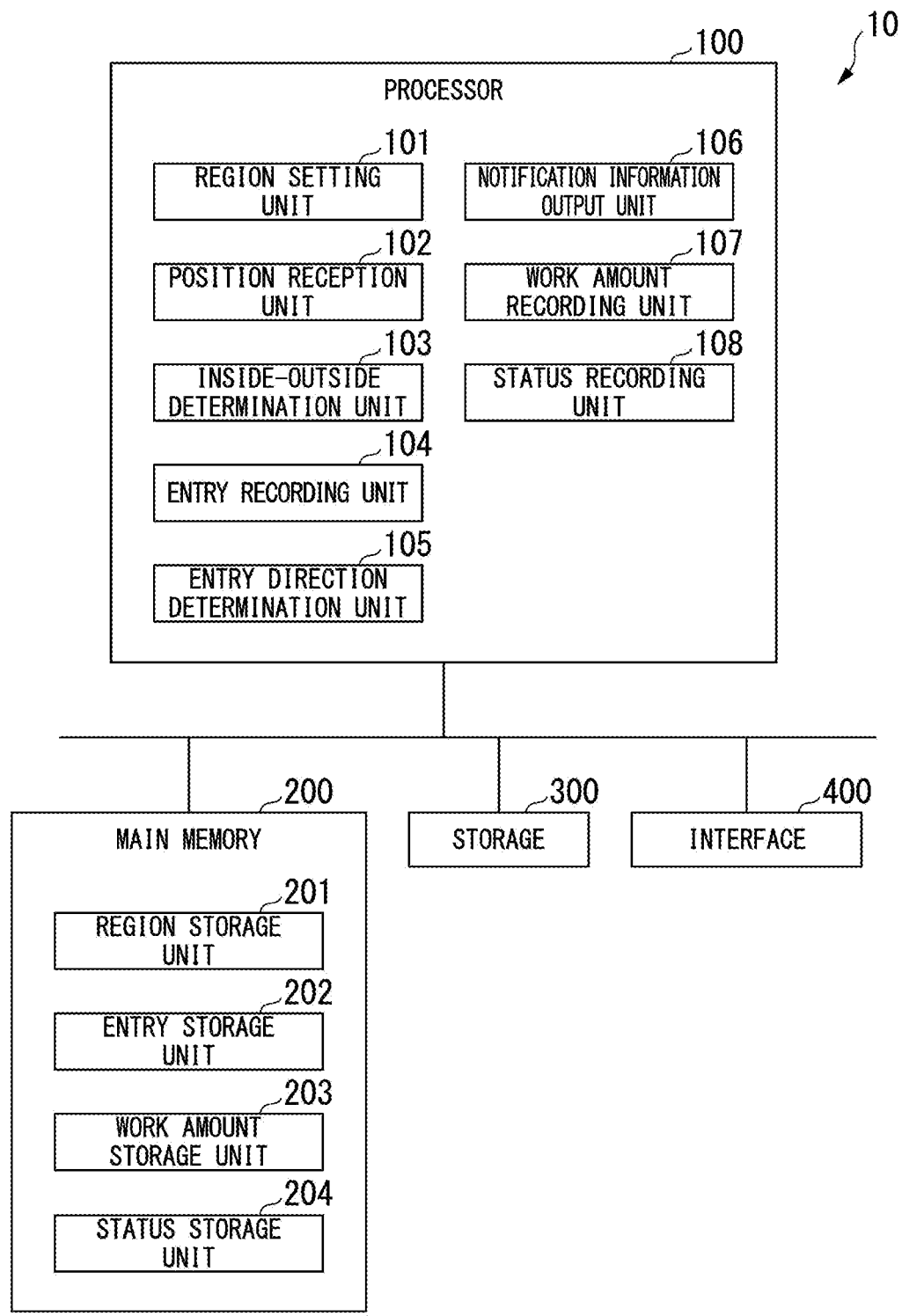
FIG. 2 is a schematic block diagram showing a configuration of the vehicle management device according to the first embodiment.

FIG. 2 is a schematic block diagram showing a configuration of the vehicle management device according to the first embodiment.

A vehicle management device 10 according to the first embodiment is a system which notifies an operator of the work machine M1 disposed in the earth cut location G1 of the approach of the dump truck M2 when the dump truck M2 approaches the earth cut location G1, and notifies an operator of the work machine M1 disposed in the banking location G2 of the approach of the dump truck M2 when the dump truck M2 approaches the banking location G2.

The vehicle management device 10 acquires position data from the computer of the dump truck M2, and determines the approach of the dump truck M2 to the earth cut location G1 or the banking location G2 on the basis of the position data. In a case where it is determined that the dump truck M2 approaches the earth cut location G1 or the banking location G2, the vehicle management device 10 outputs information indicating the approach of the dump truck M2 to the computer of the work machine M1.

The vehicle management device 10 is a computer including a processor 100, a main memory 200, a storage 300, and an interface 400. The storage 300 stores a program. The processor 100 reads the program from the storage 300, develops the program to the main memory 200, and executes processes according to the program. The vehicle management device 10 is connected to a network via the interface 400. The vehicle management device 10 is connected to input and output devices (not shown) via the interface 400.

Examples of the storage 300 may include a hard disk drive (HDD), a solid state drive (SSD), a magnetic disk, a magneto-optical disc, a compact disc read only memory (CD-ROM), a digital versatile disc read only memory (DVD-ROM), and a semiconductor memory. The storage 300 may be an internal medium which is directly connected to a bus of the vehicle management device 10, and may be an external medium which is connected to the vehicle management device 10 via the interface 400. The storage 300 is a non-transitory storage medium.

The processor 100 includes a region setting unit 101, a position reception unit 102, an inside-outside determination unit 103, an entry recording unit 104, an entry direction determination unit 105, a notification information output unit 106, a work amount recording unit 107, and a status recording unit 108, according to the execution of the program. The processor 100 secures storage regions of a region storage unit 201, an entry storage unit 202, a work amount storage unit 203, and a status storage unit 204 in the main memory 200, according to execution of the program.

The region setting unit 101 receives input of a region A used to determine output of information from a manager of the construction site G. Specifically, the region setting unit 101 receives input of an output determination region A1 which is a region A of a trigger to output information, a direction determination region A2 which is a region A used to determine an entry direction into the output determination region A1, and a display region A3 which is a region A which is displayed on the computer of the work machine M1 along with map information in association with output information. Each region A is represented by a circle. The output determination region A1 and the direction determination region A2 are regions which are different from each other in at least one of center coordinate and diameter. In other words, the output determination region A1 and the direction determination region A2 are allowed to be set to overlap each other but are not set to match each other. The region setting unit 101 receives input of the type of output, a content of information, a center coordinate of the output determination region A1, a diameter of the output determination region A1, a center coordinate of the direction determination region A2, a diameter of the direction determination region A2, a center coordinate of the display region A3, and a diameter of the display region A3. Examples of the type of output may include "output to the work machine M1", "output to the dump truck M2", "update of a work amount", and "update of a status". In a case where the type of output indicates that notification information is output to the computer of the work machine M1, the region setting unit 101 further receives input of an ID of the work machine M1 which is a notification destination. The region setting unit 101 stores the pieces of input information into the region storage unit 201 in association with each other. The region A may be a geofence. The region setting unit 101 may further set a time period in which determination of the region A is valid.

FIG. 3 is a diagram showing an example of information stored in the region storage unit according to the first embodiment.

The region storage unit 201 stores the type of output, the content of information, the center coordinate of the output determination region A1, the diameter of the output determination region A1, the center coordinate of the direction determination region A2, the diameter of the direction determination region A2, the center coordinate of the display region A3, the diameter of the display region A3, and the ID of the work machine M1 which is a notification destination, in association with a record ID. Hereinafter, a combination of pieces of information associated with a single record ID will be referred to as an output information record. As the type of output, one or more of "output to the work machine M1", "output to the dump truck M2", "update of a work amount", and "update of a status" are selected.

The position reception unit 102 receives position data indicating a position of the dump truck M2 from the computer of the dump truck M2.

The inside-outside determination unit 103 determines whether or not the dump truck M2 has entered each region A stored in the region storage unit 201 on the basis of the position data received by the position reception unit 102. Having entered the region A indicates that obtained new position data indicates a position inside the region A, and position data previously obtained indicates a position outside the region A.

In a case where the inside-outside determination unit 103 determines that the dump truck M2 has entered the direction determination region A2, the entry recording unit 104 stores an ID (truck ID) of the dump truck M2, a record ID of an output information record to which the direction determination region A2 belongs, and an entry time into the entry storage unit 202 in association with each other. In a case where a predetermined timeout time (for example, 10 minutes) elapses from the entry time, the entry recording unit 104 deletes a combination of the ID of the dump truck M2 and the record ID from the entry storage unit 202.

FIG. 4 is a diagram showing an example of information stored in the entry storage unit according to the first embodiment.

The entry storage unit 202 stores information regarding the direction determination region A2 which the dump truck M2 has entered. The entry storage unit 202 stores a truck ID, a record ID, and an entry time at which the truck ID entered the direction determination region A2 in the record indicated by the record ID in association with each other.

In a case where the inside-outside determination unit 103 determines that the dump truck M2 has entered the output determination region A1, the entry direction determination unit 105 determines whether or not an entry direction into the output determination region A1 is a direction from the direction determination region A2 toward the output determination region A1. Specifically, the entry direction determination unit 105 determines whether or not a record ID of an output information record to which the output determination region A1 belongs is stored in the entry storage unit 202 in association with the ID of the dump truck M2 having entered the output determination region A1. In a case where the record ID of the output information record to which the output determination region A1 belongs is stored in association with the ID of the dump truck M2, the entry direction determination unit 105 determines that an entry direction into the output determination region A1 is a direction from the direction determination region A2 toward the output determination region A1.

In a case where it is determined that an entry direction of the dump truck M2 into the output determination region A1 is a direction from the direction determination region A2 toward the output determination region A1, the notification information output unit 106 outputs notification information related to the output information record to which the output determination region A1 belongs.

In a case where it is determined that an entry direction of the dump truck M2 into the output determination region A1 is a direction from the direction determination region A2 toward the output determination region A1, the work amount recording unit 107 calculates a work amount of the dump truck M2 according to the output information record to which the output determination region A1 belongs. The work amount recording unit 107 outputs an update instruction for updating a work amount to the work amount storage unit 203.

FIG. 5 is a diagram showing an example of information stored in the work amount storage unit according to the first embodiment.

The work amount storage unit 203 stores a total work amount of loading work and unloading work of the dump truck M2 in the construction site G.

In a case where it is determined that an entry direction of the dump truck M2 into the output determination region A1 is a direction from the direction determination region A2 toward the output determination region A1, the status recording unit 108 specifies a status of the dump truck M2 according to the output information record to which the output determination region A1 belongs. Examples of the status of the dump truck M2 may include loaded traveling and unloaded traveling. The status recording unit 108 outputs an update instruction for updating a stored status to the status storage unit 204.

FIG. 6 is a diagram showing an example of information stored in the status storage unit according to the first embodiment.

The status storage unit 204 stores a status of each dump truck M2. In other words, the status storage unit 204 stores a status of the dump truck M2 indicated by a truck ID in association with the truck ID.

In a case where a valid time period of the region A is set in the region setting unit 101, and a time at which the dump truck M2 is located in the output determination region A1 is included in the valid time period, the notification information output unit 106, the work amount recording unit 107, and the status recording unit 108 determine whether or not information is to be output on the basis of the entry direction of the dump truck M2 into the output determination region A1.

<<Setting Method>>

Figure 7:
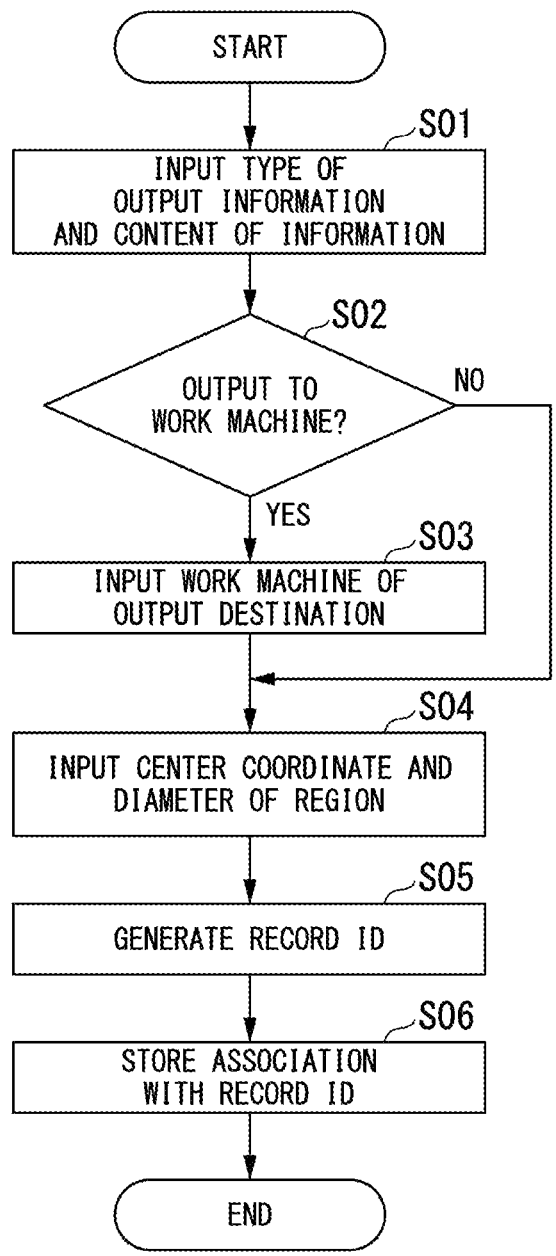
FIG. 7 is a flowchart showing a region setting method performed by the vehicle management device according to the first embodiment.
Figure 8:
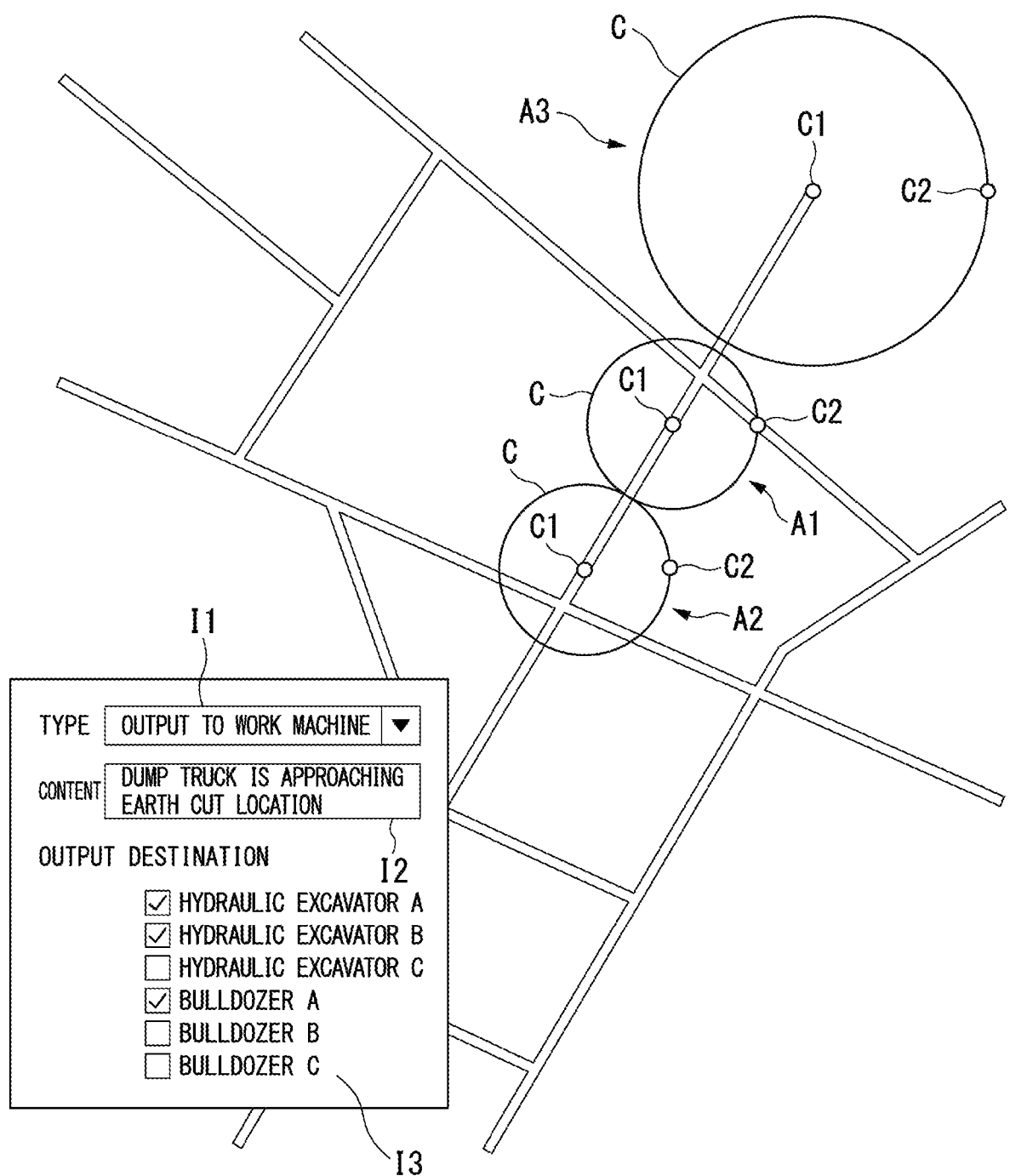
FIG. 8 is a diagram showing a display example of a region setting screen according to the first embodiment.

FIG. 7 is a flowchart showing a region setting method performed by the vehicle management device according to the first embodiment. FIG. 8 is a diagram showing a display example of a region setting screen according to the first embodiment.

First, a manager of the construction site G sets each region A according to a method shown in FIG. 7 for each piece of information to be output.

The manager accesses the vehicle management device 10 by using a computer via a network, and transmits a setting instruction for the region A to the vehicle management device 10. Examples of the computer may include a computer provided in an office of the construction site G, a tablet terminal, and a smart phone.

In a case where the setting instruction for the region A is received, the region setting unit 101 of the vehicle management device 10 receives input of the type of output and a content of information (step S01). For example, the region setting unit 101 outputs, to the computer, a setting screen including a list box I1 for receiving selection of the type of output from a list and a text box 12 for receiving input of a content of information. In the first embodiment, the type of output is selected from among "output to the work machine M1", "output to the dump truck M2", "update of a work amount", and "update of a status". In a case where the type of output is "output to the work machine M1" or "output to the dump truck M2", the content of information is text indicating notification information to be output to the work machine M1 or the dump truck M2. In a case where the type of output is "update of a work amount", the content of information is a work type (loading work or unloading work) to be updated. In a case where the type of output is "update of a status", the content of information is an updated status (loaded traveling or unloaded traveling).

In a case where input of the type of output and the content of information is received, the region setting unit 101 determines whether or not the type of output is "output to the work machine M1" (step S02). In a case where the type of output is "output to the work machine M1" (step S02: YES), the region setting unit 101 further receives input of an ID of the work machine M1 which is an information output destination (step S03). For example, the region setting unit 101 outputs a setting screen including a checkbox list 13 associated with each work machine M1, to the computer. For example, the region setting unit 101 may output an input screen including a radio button for selecting the earth cut location G1 or the banking location G2 to the computer. In this case, the region setting unit 101 determines all work machines M1 disposed in a selected location of the earth cut location G1 and the banking location G2, as the work machines M1 which are information output destinations. In a case where the type of output is not "output to the work machine M1" (step S02: NO), the region setting unit 101 receives input of an ID of the work machine M1 which is an information output destination.

In a case where input of the type of output and the content of information is received, the region setting unit 101 receives input of a center coordinate and a diameter of the output determination region A1, a center coordinate and a diameter of the direction determination region A2, and a center coordinate and a diameter of the display region A3 (step S04). For example, the region setting unit 101 outputs, to the computer, a setting screen including a map of the periphery of the construction site G, a circle C representing the output determination region A1, a circle C representing the direction determination region A2, and a circle C representing the display region A3. The circle C representing the region A has a center handle C1 representing a center point of the circle C and a boundary handle C2 provided on a contour of the circle C. The manager operates the computer to move the center handle C1 of each circle C, and thus sets a center coordinate of the region A. The manager operates the computer to move the boundary handle C2 of each circle C, and thus sets a diameter of the region A. Movement of the center handle C1 and the boundary handle C2 is performed through, for example, a drag-and-drop operation using a mouse or a touch panel. In other words, the position and the size of each region A are set to arbitrary position and size. Each region A may be set to partially or entirely overlap another region.

In a case where input of a center coordinate and a diameter of each region A is received, the region setting unit 101 generates a new record ID (step S05), and stores various pieces of input information into the region storage unit 201 in association with the record ID (step S06). The record ID is generated as a unique value.

In a case where the region A is set according to the procedure, the computer of the work machine M1 and the computer of the dump truck M2 may access the vehicle management device 10 so as to acquire and display information regarding the set region A. The computer of the work machine M1 and the computer of the dump truck M2 display a graphic representing at least the display region A3 to be superimposed on a map. Consequently, an operator of the work machine M1 and an operator of the dump truck M2 can recognize the region A regarding which information is output. The computer of the work machine M1 and the computer of the dump truck M2 may display the output determination region A1 and the direction determination region A2 in addition to the display region A3 in response to the operators' operations.

<<Output Method>>

Figure 9:
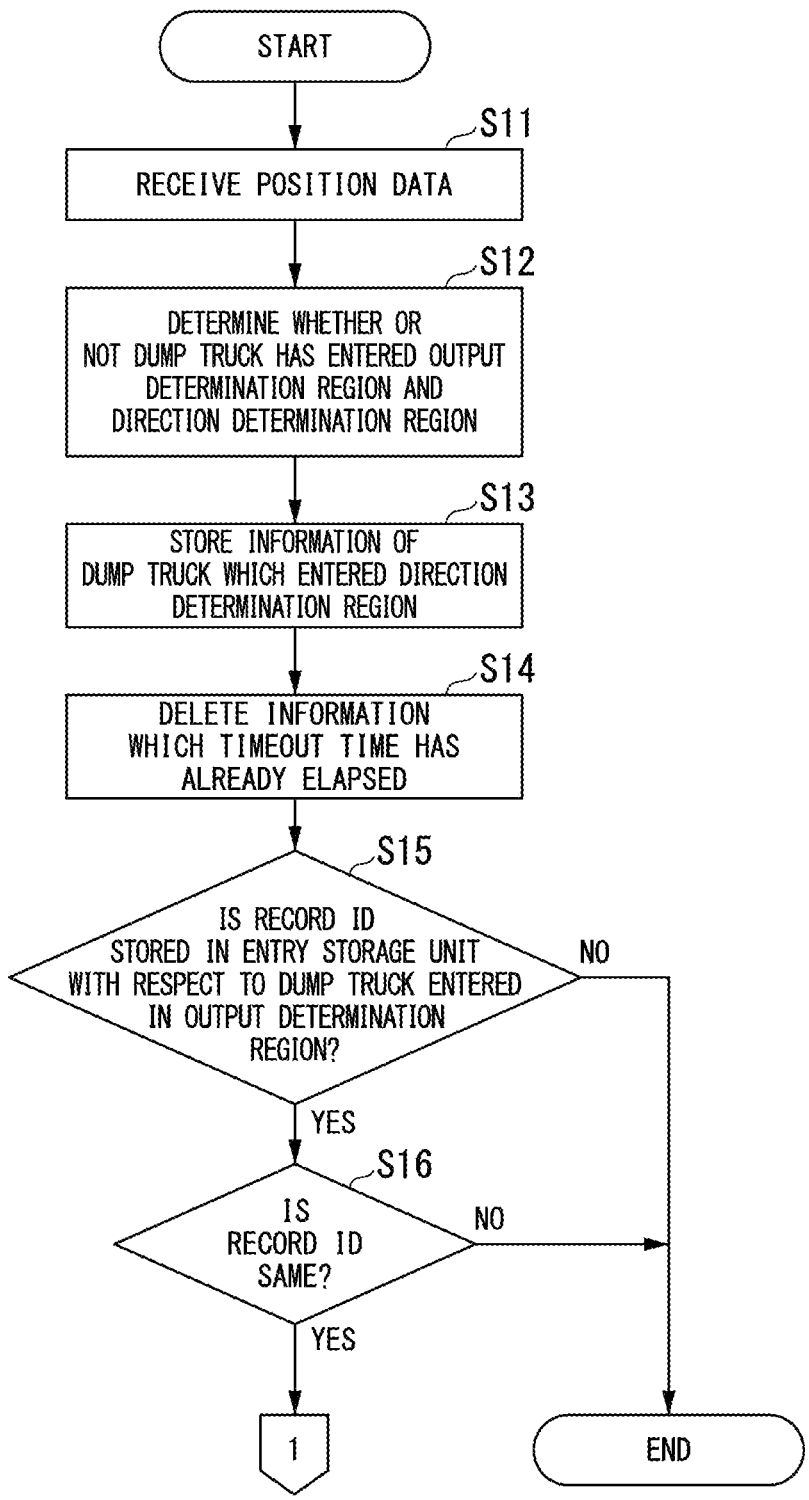
FIG. 9 is a first flowchart showing an information output method performed by the vehicle management device according to the first embodiment.
Figure 10:
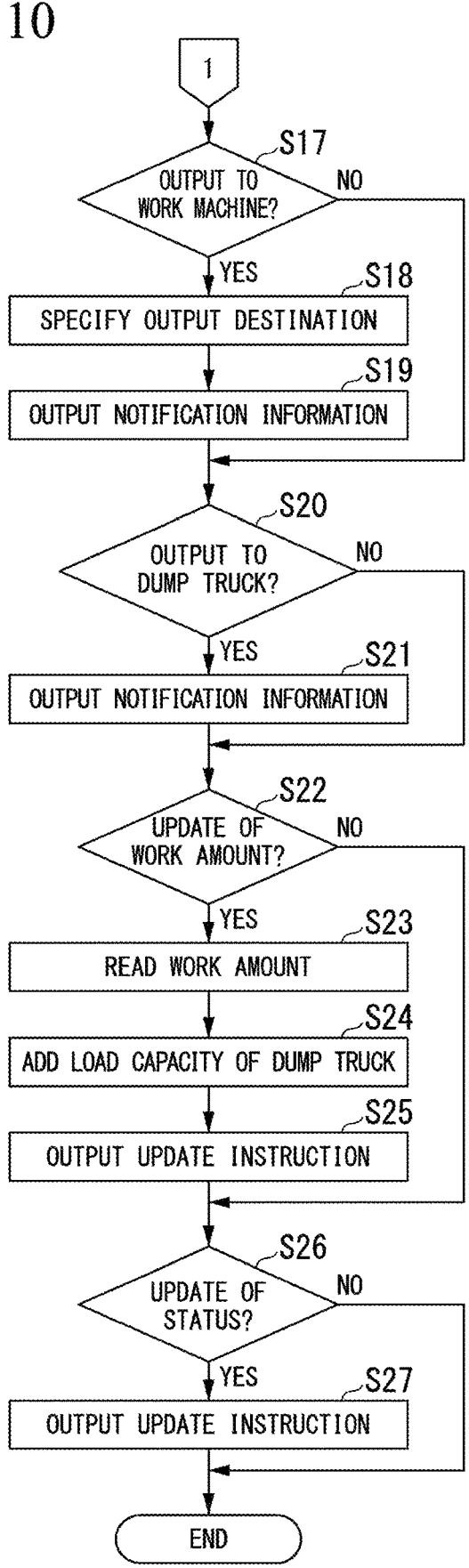
FIG. 10 is a second flowchart showing an information output method performed by the vehicle management device according to the first embodiment.

FIG. 9 is a first flowchart showing an information output method performed by the vehicle management device according to the first embodiment. FIG. 10 is a second flowchart showing an information output method performed by the vehicle management device according to the first embodiment. The flowchart of FIG. 9 illustrates a process of determining whether or not the vehicle management device 10 is to output information, and the flowchart of FIG. 10 illustrates a process in which the vehicle management device 10 outputs various pieces of information.

In a case where the vehicle management device 10 starts an information output process based on the region A, the position reception unit 102 receives position data indicating a position of the dump truck M2 from the computer of the dump truck M2 (step S11). Next, the inside-outside determination unit 103 determines whether or not the dump truck M2 has entered the output determination region A1 and the direction determination region A2 in each output information record stored in the region storage unit 201 on the basis of the received position data (step S12).

With respect to the dump truck M2 determined as having entered the direction determination region A2 by the inside-outside determination unit 103, the entry recording unit 104 stores a truck ID of the dump truck M2, a record ID of an output information record to which the direction determination region A2 which the dump truck M2 has entered belongs, and an entry time into the entry storage unit 202 in association with each other (step S13).

Among combinations of truck IDs and record IDs stored in the entry storage unit 202, the entry recording unit 104 deletes a combination with which a timeout time has already elapsed from an entry time associated, from the entry storage unit 202 (step S14).

Next, with respect to the dump truck M2 determined as having entered the output determination region A1 by the inside-outside determination unit 103, the entry direction determination unit 105 determines whether or not there is a record ID associated with the truck ID of the dump truck M2 in the entry storage unit 202 (step S15).

In a case where the record ID is associated with the truck ID (step S15: YES), the entry direction determination unit 105 determines whether or not the record ID is a record ID of the output information record to which the output determination region A1 which the dump truck M2 has entered belongs (step S16). In other words, the entry direction determination unit 105 determines whether or not the dump truck M2 entered the direction determination region A2 related to the same record ID, and then has entered the output determination region A1. In other words, the entry direction determination unit 105 determines whether or not an advancing direction of the dump truck M2 is a direction from the direction determination region A2 toward the output determination region A1.

In a case where the record ID related to the output determination region A1 which the dump truck M2 has entered is stored in the entry storage unit 202 in association with the truck ID of the dump truck M2 (step S16: YES), the entry direction determination unit 105 determines that the advancing direction of the dump truck M2 is a direction from the direction determination region A2 toward the output determination region A1. On the other hand, in a case where the record ID related to the output determination region A1 which the dump truck M2 has entered is not stored in the entry storage unit 202 in association with the truck ID of the dump truck M2 (step S15: NO or step S16: NO), the entry direction determination unit 105 determines that the advancing direction of the dump truck M2 is not a direction from the direction determination region A2 toward the output determination region A1 or determines that the dump truck M2 does not travel along a predetermined traveling route.

In a case where the entry direction determination unit 105 determines that the advancing direction of the dump truck M2 is a direction from the direction determination region A2 toward the output determination region A1 (step S16: YES), the notification information output unit 106 determines whether or not the type of output in an information output record related to the output determination region A1 which the dump truck M2 has entered includes "output to the work machine M1" (step S17).

In a case where the type of output in the output information record includes "output to the work machine M1" (step S17: YES), the notification information output unit 106 specifies the work machine M1 which is an output destination associated with the information output record (step S18). The notification information output unit 106 outputs notification information indicating a content of information associated with the information output record to the computer of the specified work machine M1 (step S19). On the other hand, in a case where the type of output in the information output record includes "output to the work machine M1" (step S17: NO), the notification information output unit 106 does not output notification information to the computer of the work machine M1.

The notification information output unit 106 determines whether or not the type of output in the information output record related to the output determination region A1 which the dump truck M2 has entered includes "output to the dump truck M2" (step S20).

In a case where the type of output in the information output record includes "output to the dump truck M2" (step S20: YES), the notification information output unit 106 outputs notification information indicating a content of information associated with the output information record to the computer of the dump truck M2 having entered the output determination region A1 (step S21). On the other hand, in a case where the type of output in the information output record does not include "output to the dump truck M2" (step S20: NO), the notification information output unit 106 does not output notification information to the computer of the dump truck M2.

The work amount recording unit 107 determines whether or not the type of output in the information output record related to the output determination region A1 which the dump truck M2 has entered includes "update of a work amount" (step S22).

In a case where the type of output in the information output record includes "update of a work amount" (step S22: YES), the work amount recording unit 107 specifies a content of information associated with the information output record, that is, a work type, and reads a work amount related to the work type from the work amount storage unit 203 (step S23). The work amount recording unit 107 adds a load capacity of the dump truck M2 having entered the output determination region A1 to the read work amount, so as to calculates a work amount (step S24). A loaded amount of earth and sand may be defined on the basis of, for example, the maximum load capacity of the dump truck M2, may be defined for each type of dump truck M2, and may be defined on the basis of measurement using a truck scale or the like. The work amount recording unit 107 outputs an update instruction for overwriting the calculated work amount on the work amount stored to be associated with the work type specified in step S23, to the work amount storage unit 203 (step S25). On the other hand, in a case where the type of output in the information output record does not include "update of a work amount" (step S22: NO), the work amount recording unit 107 does not output an update instruction to the work amount storage unit 203.

The status recording unit 108 determines whether or not the type of output in the information output record related to the output determination region A1 which the dump truck M2 has entered includes "update of a status" (step S26).

In a case where the type of output in the information output record includes "update of a status" (step S26: YES), the status recording unit 108 specifies a content of information associated with the information output record, that is, a status, and outputs an update instruction for overwriting the specified status on a status associated with the dump truck M2 having entered the output determination region A1, to the status storage unit 204 (step S27). On the other hand, in a case where the type of output in the information output record does not include "update of a status" (step S26: NO), the status recording unit 108 does not output an update instruction to the status storage unit 204.

<<Advantageous Effect>>

As mentioned above, in a case where an entry direction of the dump truck M2 into the output determination region A1 is a predetermined direction, the vehicle management device 10 according to the first embodiment determines whether or not predetermined information is to be output. Consequently, a manager can appropriately output information by designating a direction in which the information is to be output even in a case where there is another road with a different passage direction in the vicinity of a road including a location where the information is to be output.

Modification Examples

The vehicle management device 10 according to the first embodiment outputs information in a case where an entry direction of the dump truck M2 into the output determination region A1 is a predetermined direction, but is not limited thereto. For example, the vehicle management device 10 according to other embodiments may output information in a case where an entry direction of the dump truck M2 into the output determination region A1 is not a predetermined direction. In this case, the vehicle management device 10 does not output in a case where a record ID related to the output determination region A1 which the dump truck M2 has entered is stored in the entry storage unit 202 in association with a truck ID of the dump truck M2, and outputs information in a case where the record ID related to the output determination region A1 which the dump truck M2 has entered is not stored in the entry storage unit 202 in association with the truck ID of the dump truck M2.

For example, the region A according to the first embodiment is circular but is not limited thereto. For example, in other embodiments, a shape of the region A may be represented by other geometric graphics. For example, the region A according to the first embodiment is set by moving the center handle C1 and the boundary handle C2 on the setting screen shown in FIG. 8, but is not limited thereto. For example, in other embodiments, the region A may be set by manually inputting a center coordinate and a diameter of each region A in numerical values.

Second Embodiment

The vehicle management device 10 according to the first embodiment sets the respective circular regions A as the output determination region A1 and the direction determination region A2 and outputs information on the basis of whether or not the dump truck M2 has entered the regions A. In contrast, the vehicle management device 10 according to the second embodiment divides a single circular region A into two fan-shaped regions A and determines whether or not information is required to be output on the basis of the separate regions A.

The vehicle management device 10 of the second embodiment is different from that of the first embodiment in terms of a data structure in an information output record stored in the region storage unit 201.

FIG. 11 is a diagram showing an example of information stored in a region storage unit according to the second embodiment.

The region storage unit 201 stores the type of output, a content of information, a center coordinate of a determination region A4, a diameter of the determination region A4, a first azimuth of the determination region A4, a second azimuth of the determination region A4, a center coordinate of the display region A3, a diameter of the display region A3, and an ID of the work machine M1 which is a notification destination, in association with a record ID. The region storage unit 201 according to the second embodiment stores information regarding the determination region A4 instead of the output determination region A1 and the direction determination region A2. The determination region A4 is the region A used to determine whether or not information is required to be output and determine an entry direction of a vehicle.

The first azimuth and the second azimuth are information for dividing the determination region A4 into the output determination region A1 and the direction determination region A2. The determination region A4 is divided into a half straight line extending in the first azimuth from the center coordinate and a half straight line extending in the second azimuth, and a region located in a clockwise direction from the first azimuth is set as the output determination region A1. On the other hand, the determination region A4 is divided into a half straight line extending in the first azimuth from the center coordinate and a half straight line extending in the second azimuth, and a region located in a counterclockwise direction from the first azimuth is set as the direction determination region A2. In other words, the output determination region A1 and the direction determination region A2 are respective set as fan-shaped regions having a common center point.

<<Setting Method>>

Figure 12:
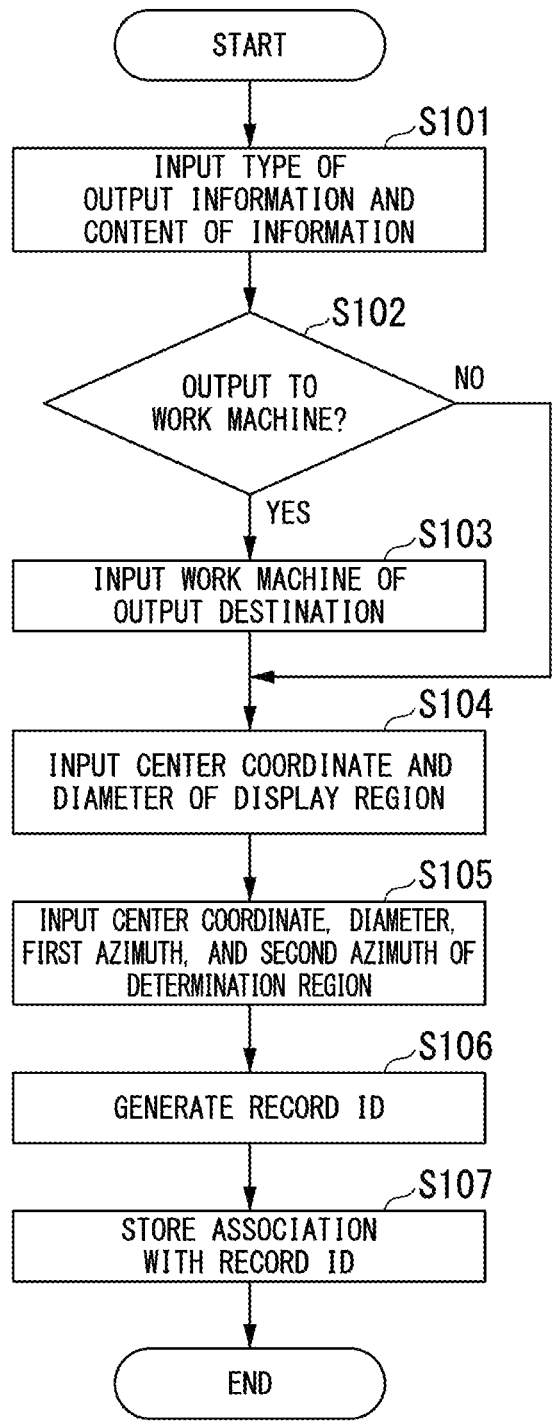
FIG. 12 is a flowchart showing a region setting method performed by the vehicle management device according to the second embodiment.
Figure 13:
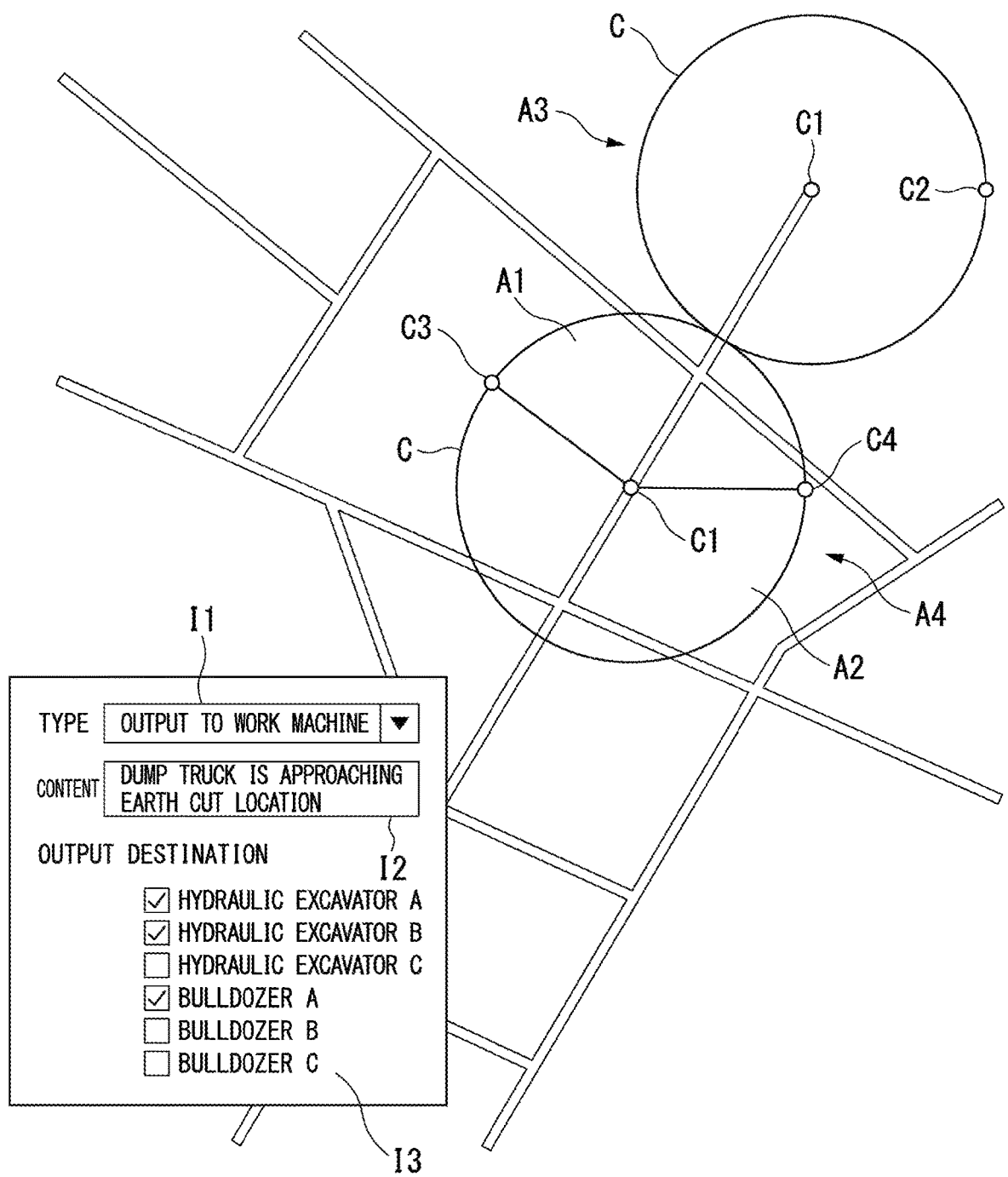
FIG. 13 is a diagram showing a display example of a region setting screen according to the second embodiment.

FIG. 12 is a flowchart showing a region setting method performed by the vehicle management device according to the second embodiment. FIG. 13 is a diagram showing a display example of a region setting screen according to the second embodiment.

First, a manager of the construction site G sets each region A according to a method shown in FIG. 12 for each piece of information to be output.

The manager accesses the vehicle management device 10 by using a computer via a network, and transmits a setting instruction for the region A to the vehicle management device 10.

In a case where the setting instruction for the region A is received, the region setting unit 101 of the vehicle management device 10 executes processes in step S101 to step S103 in FIG. 12. The processes in step S101 to step S103 in FIG. 12 are the same as the processes in step S01 to step S03 in FIG. 7.

In a case where input of the type of output and the content of information is received through the processes in step S101 to step S103, the region setting unit 101 receives input of a center coordinate and a diameter of the display region A3 (step S104).

The region setting unit 101 receives input of a center coordinate, a diameter, a first azimuth, and a second azimuth of the determination region A4 (step S105). For example, as shown in FIG. 13, the region setting unit 101 outputs, to the computer, a setting screen including a circle C representing the determination region A4 in a map of the periphery of the construction site G. The circle C representing the determination region A4 has a center handle C1 representing a center point of the circle C, and a first boundary handle C3 and a second boundary handle C4 provided on a contour of the circle C. The manager operates the computer to move the center handle C1 of the circle C representing the determination region A4, and thus sets a center coordinate of the determination region A4. The manager operates the computer to move the first boundary handle C3 of the circle C, and thus sets a diameter and a first azimuth of the determination region A4. The manager operates the computer to move the second boundary handle C4 of the circle C, and thus sets a diameter and a second azimuth of the determination region A4.

The region setting unit 101 generates a new record ID (step S106), and stores various pieces of input information into the region storage unit 201 in association with the record ID (step S107).

<<Advantageous Effect>>

As mentioned above, the vehicle management device 10 according to the second embodiment sets the output determination region A1 and the direction determination region A2 as respective fan-shaped regions having a common center point. Consequently, in the same manner as in the first embodiment, the vehicle management device 10 according to the second embodiment can appropriately output information even in a case where there is another road with a different passage direction in the vicinity of a road including a location where the information is to be output.

Third Embodiment

The vehicle management device 10 according to the first embodiment sets the respective circular regions A as the output determination region A1 and the direction determination region A2. In contrast, the vehicle management device 10 according to the third embodiment sets the direction determination region A2 and the display region A3, and automatically specifies the output determination region A1 on the basis of such information.

Figure 14:
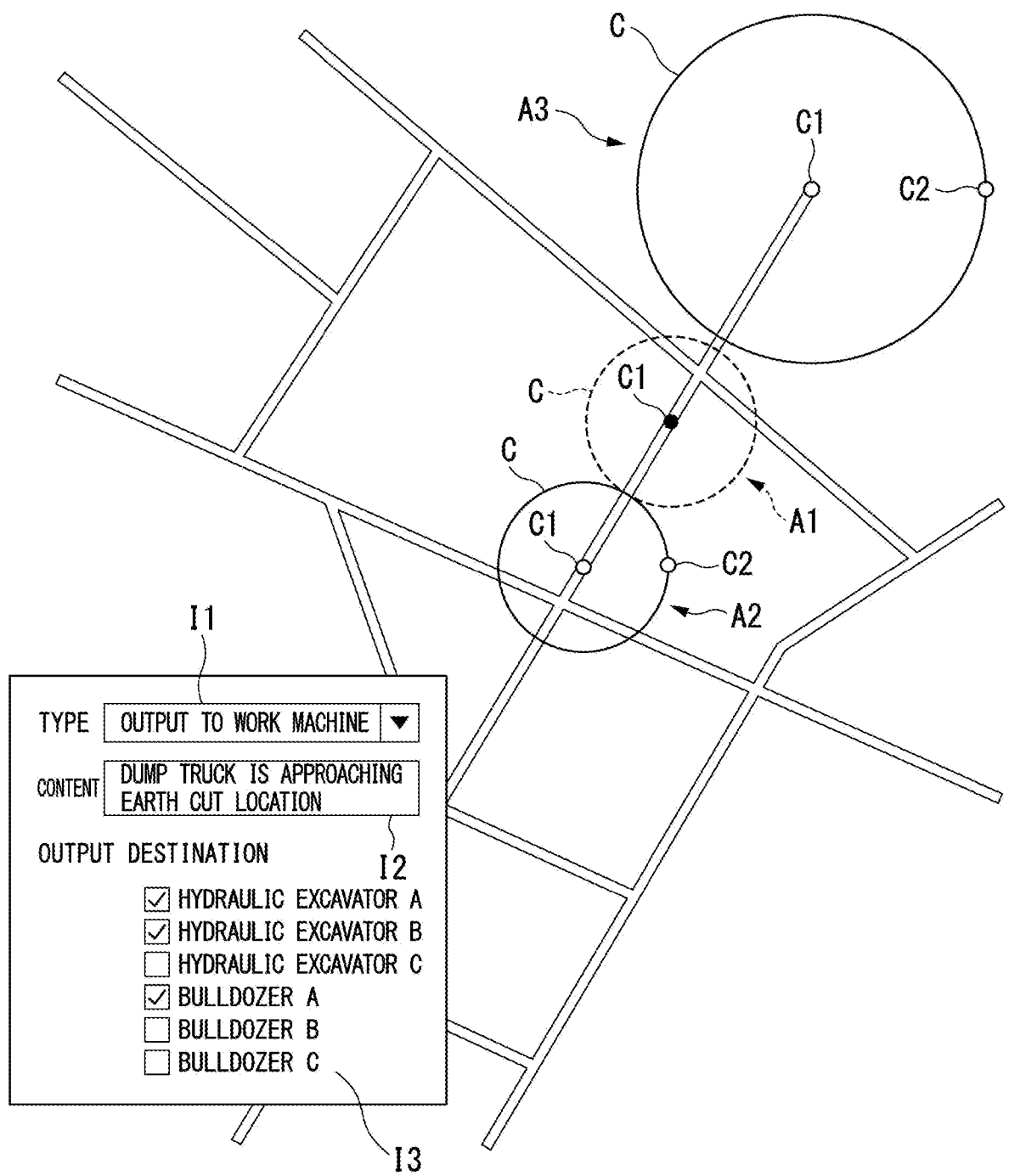
FIG. 14 is a diagram showing a display example of a region setting screen according to a third embodiment.

The vehicle management device 10 of the third embodiment is different from that of the first embodiment in terms of a configuration of the region setting unit 101. FIG. 14 is a diagram showing a display example of a region setting screen according to the third embodiment.

The region setting unit 101 receives input of a center coordinate and a diameter of the direction determination region A2 and a center coordinate and a diameter of the display region A3. In this case, the region setting unit 101 does not receive input of a center coordinate and a diameter of the output determination region A4. The center coordinate of the display region A3 is an example of a destination of a vehicle.

For example, the region setting unit 101 outputs, to the computer, a setting screen including a map of the periphery of the construction site G, a circle C representing the direction determination region A2, and a circle C representing the display region A3. In this case, a circle C representing the output determination region A1 may or not be displayed on the setting screen. Each of the circle C representing the direction determination region A2 and the circle C representing the display region A3 has a center handle C1 and a boundary handle C2. On the other hand, in a case where the circle C representing the output determination region A1 is displayed, the circle C does not have the center handle C1 and the boundary handle C2.

The manager operates the computer to move the center handles C1 and the boundary handles C2 of the circle C representing the direction determination region A2 and the circle C representing the display region A3, and thus sets center coordinates and diameters of the direction determination region A2 and the display region A3.

In a case where the center coordinates and the diameters of the direction determination region A2 and the display region A3 are set, the region setting unit 101 calculates a coordinate of a point P which divides a line segment connecting the direction determination region A2 to the display region A3 at a predetermined ratio. The region setting unit 101 sets the point P as a center coordinate, and determines a circular region having the same diameter as that of the direction determination region A2 as the output determination region A1.

<<Advantageous Effect>>

As mentioned above, the vehicle management device 10 according to the third embodiment sets, as the output determination region A1, the region A including a location on a line segment connecting a center point of the direction determination region A2 to a center point of the display region A3. Consequently, the vehicle management device 10 according to the third embodiment can automatically set the output determination region A1.

Fourth Embodiment

The vehicle management device 10 according to the first embodiment sets the respective circular regions A as the output determination region A1 and the direction determination region A2, and outputs information on the basis of whether or not the dump truck M2 has entered the regions A. In contrast, the vehicle management device 10 according to the fourth embodiment determines whether or not information is required to be output on the basis of position information before entry into the output determination region A1.

<<Vehicle Management Device>>

Figure 15:
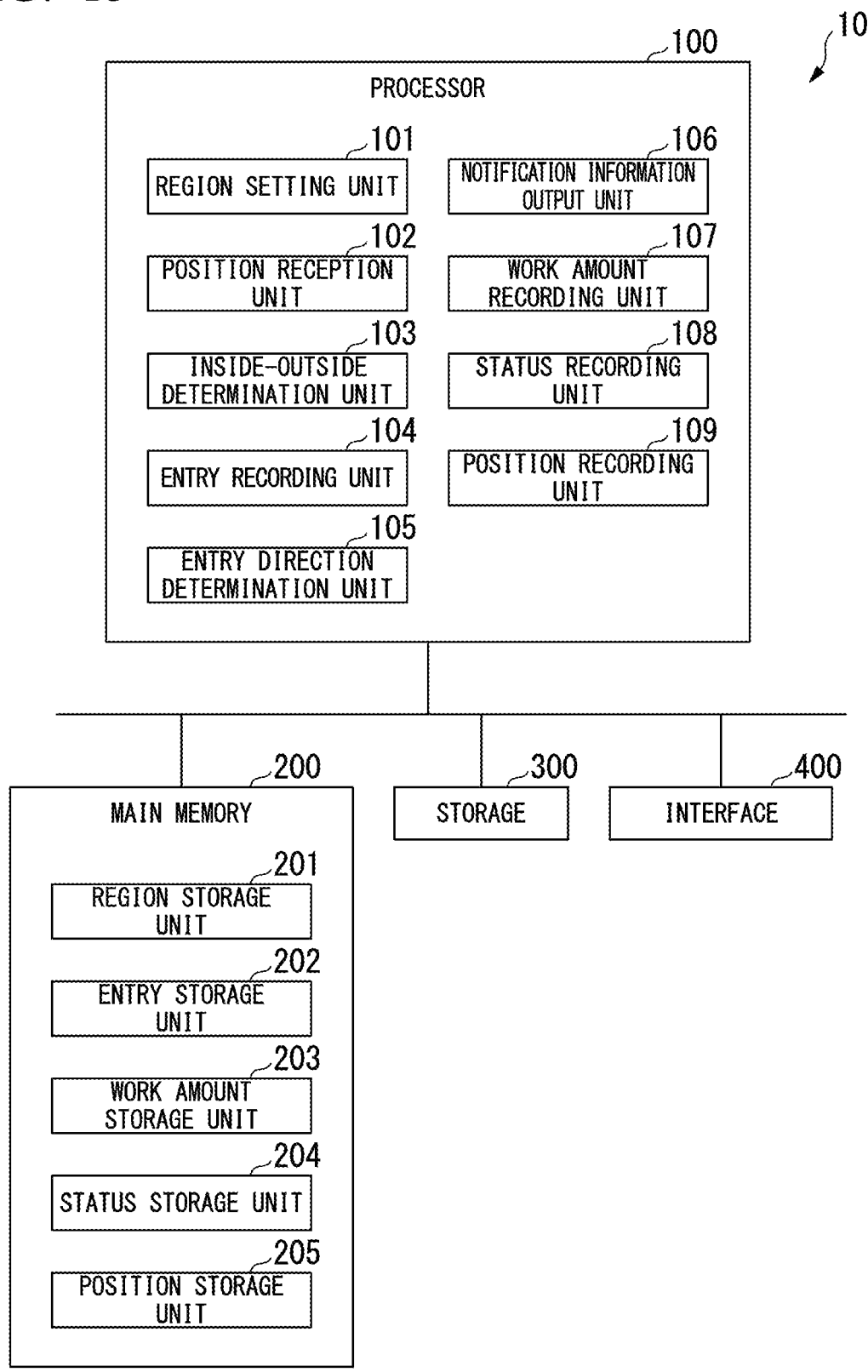
FIG. 15 is a schematic block diagram showing a configuration of a vehicle management device according to a fourth embodiment.

FIG. 15 is a schematic block diagram showing a configuration of the vehicle management device according to the fourth embodiment.

The vehicle management device 10 according to the fourth embodiment further includes a position recording unit 109 in addition to the configuration of the first embodiment, and a position storage unit 205 is secured in the main memory 200.

The position recording unit 109 stores position data of the dump truck M2 received by the position reception unit 102 into the position storage unit 205 in association with a truck ID of the dump truck M2 and an acquisition time of the position data.

The position storage unit 205 stores the truck ID of the dump truck M2, the position data, and the acquisition time of the position data in association with each other. In other words, the position storage unit 205 stores a time series of position data for each dump truck M2.

<<Setting Method>>

Figure 17:
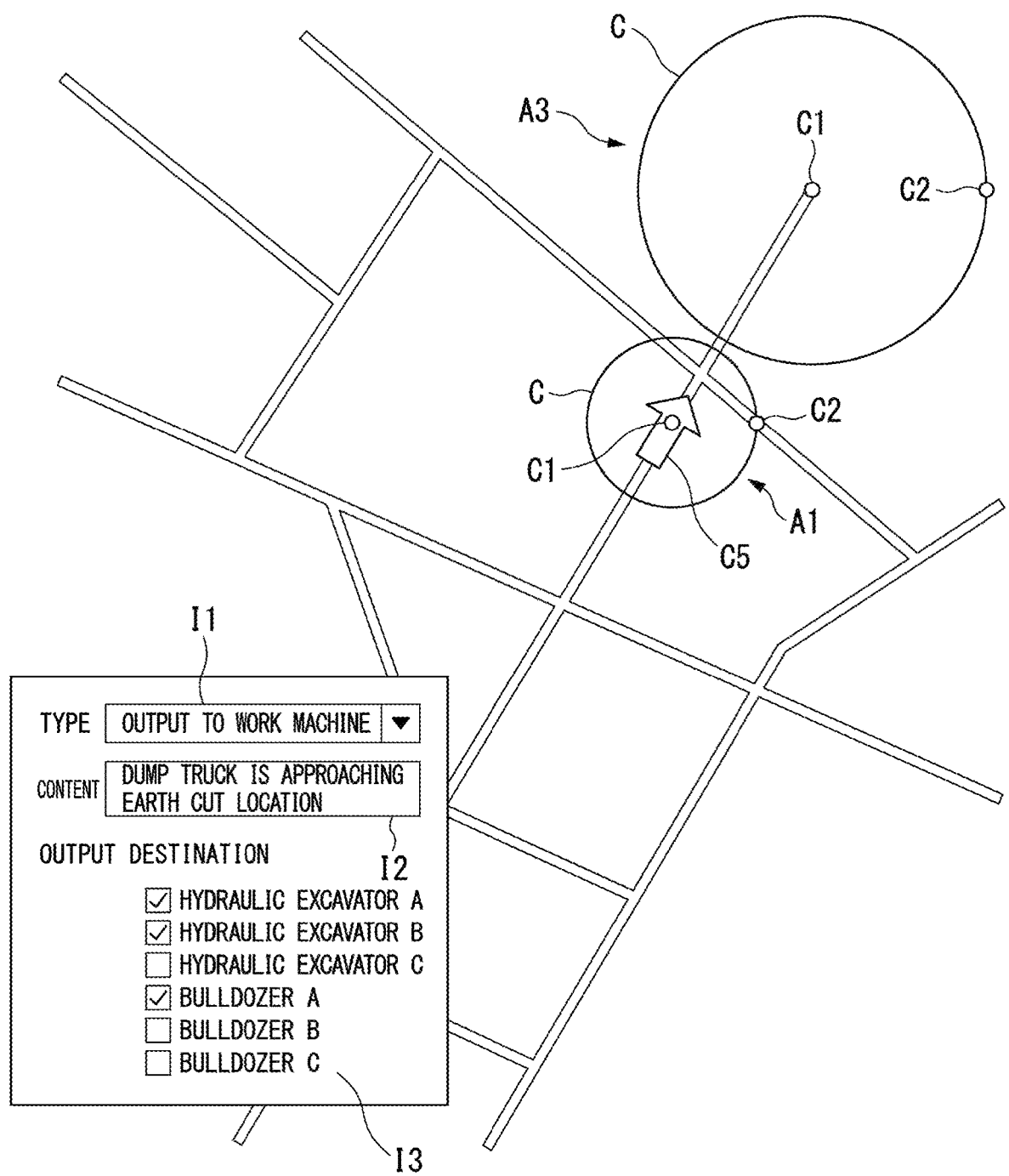
FIG. 17 is a diagram showing a display example of a region setting screen according to the fourth embodiment.

The vehicle management device 10 of the fourth embodiment is different from that of the first embodiment in terms of a configuration of the region setting unit 101 and information stored in the region storage unit 201. The vehicle management device 10 according to the fourth embodiment does not set the direction determination region A2. FIG. 16 is a diagram showing an example of information stored in the region storage unit according to the fourth embodiment. FIG. 17 is a diagram showing a display example of a region setting according to the fourth embodiment.

The region storage unit 201 according to the fourth embodiment stores an entry direction into the output determination region A1 instead of information related to the direction determination region A2.

The region setting unit 101 receives input of a center coordinate and a diameter of the output determination region A1 and an entry direction thereinto, and a center coordinate and a diameter of the display region A3.

For example, as shown in FIG. 17, the region setting unit 101 outputs, to the computer, a setting screen including a map of the periphery of the construction site G, a circle C representing the output determination region A1, and a circle C representing the display region A3. The circle C representing the output determination region A1 has an arrow C5 in addition to the center handle C1 and the boundary handle C2. The arrow C5 is rotated about the center handle C1 through a drag operation. The manager operates the computer to set a direction of the arrow C5, and thus sets an entry direction into the output determination region A1.

<<Output Method>>

Figure 18:
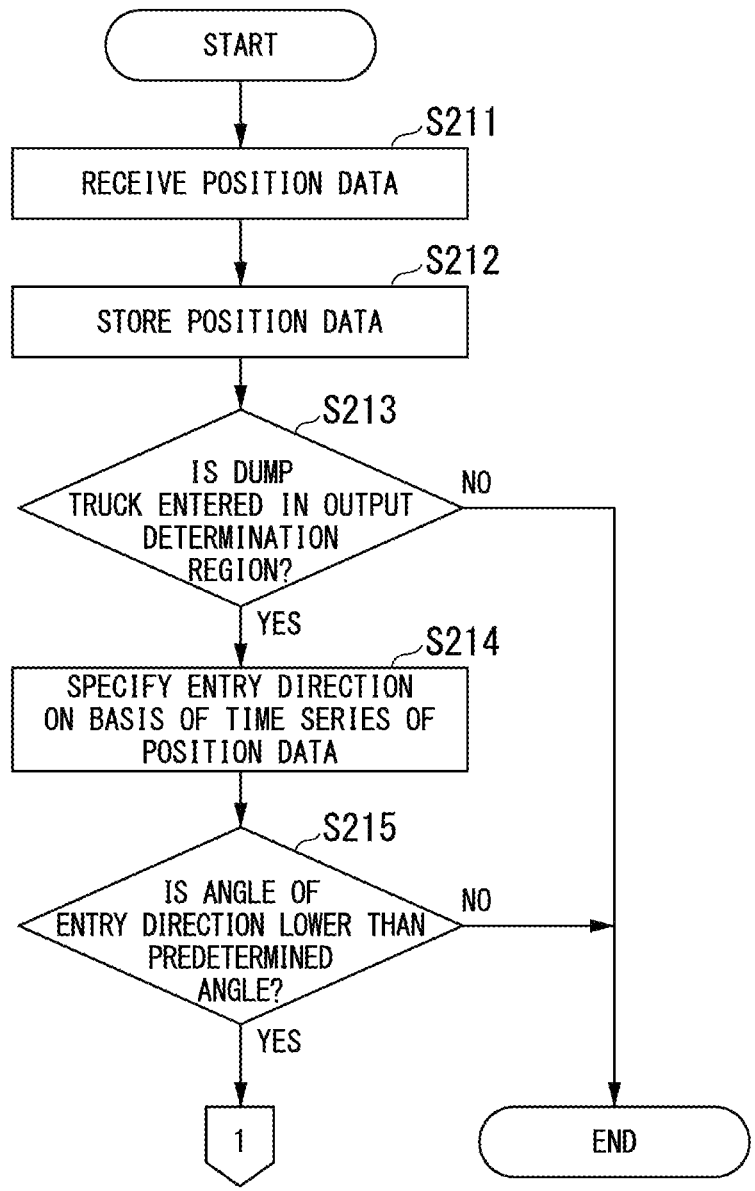
FIG. 18 is a first flowchart showing an information output method performed by the vehicle management device according to the fourth embodiment.

FIG. 18 is a first flowchart showing an information output method performed by the vehicle management device according to the fourth embodiment. A second flowchart showing an information output method performed by the vehicle management device according to the fourth embodiment is the same as that of FIG. 10, and is thus omitted.

In a case where the vehicle management device 10 starts an information output process based on the region A, the position reception unit 102 receives position data indicating a position of the dump truck M2 from the computer of the dump truck M2 (step S211). The position recording unit 109 stores the received position data into the position storage unit 205 in association with a truck TD of the dump truck M2 and an acquisition time thereof (step S212).

Next, the inside-outside determination unit 103 determines whether or not the dump truck M2 has entered the output determination region A1 of each output information record stored in the region storage unit 201 on the basis of the received position data (step S213). In a case where the dump truck M2 has entered the output determination region A1 (step S213: YES), the entry direction determination unit 105 specifies an entry direction of the dump truck M2 into the output determination region A1 on the basis of a time series of position data of the dump truck M2 stored in the position storage unit 205 (step S214). For example, the entry direction determination unit 105 calculates an entry direction on the basis of changes in positions indicated by two pieces of the latest position data in the time series of position data.

The entry direction determination unit 105 determines whether or not an angle formed between an entry direction of the dump truck M2 into the output determination region A1 stored in the region storage unit 201 and the entry direction specified in step S214 is lower than a predetermined angle (step S215). In a case where the angle formed between the two entry directions is lower than the predetermined angle (step S215: YES), the vehicle management device 10 executes the processes in step S17 and the subsequent steps shown in FIG. 10. On the other hand, in a case where the dump truck M2 has not entered the output determination region A1 (step S213: NO), or the angle formed between the two entry directions is equal to or higher than the predetermined angle (step S215: NO), the vehicle management device 10 finishes the information output process.

<<Advantageous Effect>>

As mentioned above, the vehicle management device 10 according to the fourth embodiment determines whether or not an entry direction of the dump truck M2 into the output determination region A1 is a predetermined direction on the basis of position data stored in the position storage unit 205 in a case where the dump truck M2 is located in the output determination region A1. Consequently, the vehicle management device 10 according to the fourth embodiment can appropriately output information even in a case where there is another road with a different passage direction in the vicinity of a road including a location where the information is to be output, without setting the direction determination region A2.

Fifth Embodiment

The vehicle management device 10 according to the fourth embodiment specifies an entry direction into the output determination region A1 on the basis of a time series of position data. In contrast, the vehicle management device 10 according to the fifth embodiment specifies an entry direction into the output determination region A1 on the basis of azimuth data.

<<Vehicle Management Device>>

Figure 19:
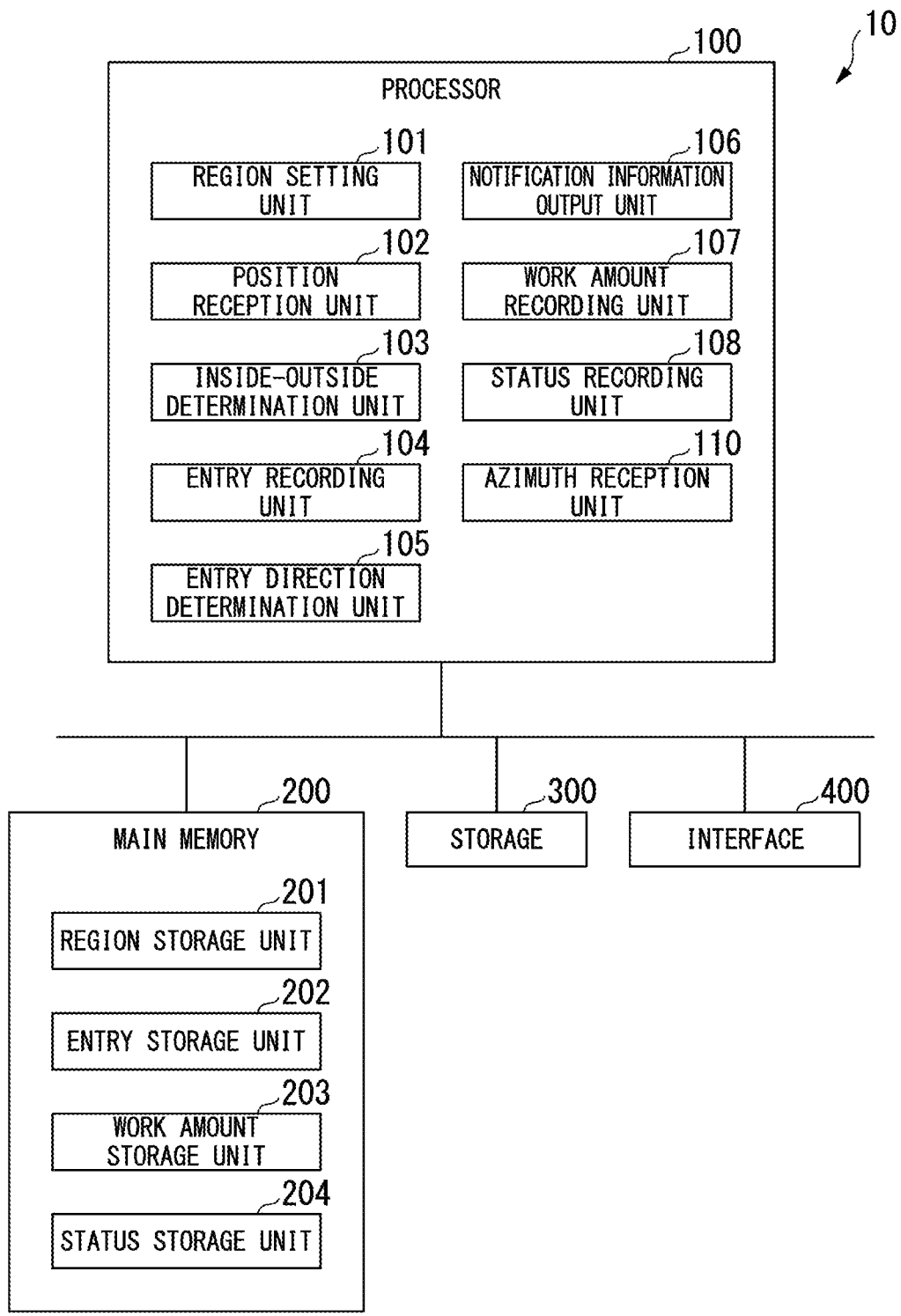
FIG. 19 is a schematic block diagram showing a configuration of a vehicle management device according to a fifth embodiment.

FIG. 19 is a schematic block diagram showing a configuration of the vehicle management device according to the fifth embodiment.

The vehicle management device 10 according to the fifth embodiment further includes an azimuth reception unit 110 in addition to the configuration of the first embodiment. The azimuth reception unit 110 receives azimuth data indicating an azimuth in which the dump truck M2 is directed from the computer of the dump truck M2. A method of setting the region A in the fifth embodiment is the same as that in the fourth embodiment. The azimuth data is acquired by, for example, an electronic compass of the computer of the dump truck M2.

<<Output Method>>

Figure 20:
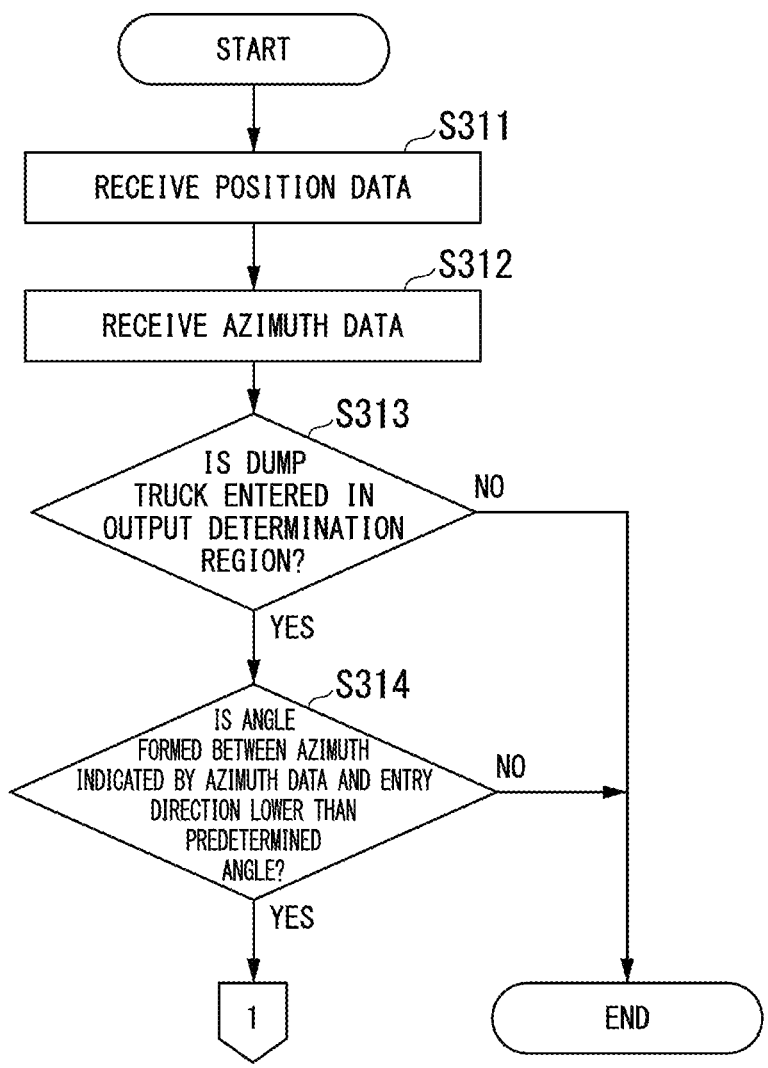
FIG. 20 is a first flowchart showing an information output method performed by the vehicle management device according to the fifth embodiment.

FIG. 20 is a first flowchart showing an information output method performed by the vehicle management device according to the fifth embodiment. A second flowchart showing an information output method performed by the vehicle management device according to the fifth embodiment is the same as that of FIG. 10, and is thus omitted.

In a case where the vehicle management device 10 starts an information output process based on the region A, the position reception unit 102 receives position data indicating a position of the dump truck M2 from the computer of the dump truck M2 (step S311). The azimuth reception unit 110 receives azimuth data indicating an azimuth in which the dump truck M2 is directed from the computer of the dump truck M2 (step S312).

Next, the inside-outside determination unit 103 determines whether or not the dump truck M2 has entered the output determination region A1 in an output information record stored in the region storage unit 201 on the basis of the received position data (step S313). In a case where the dump truck M2 has entered the output determination region A1 (step S313: YES), the entry direction determination unit 105 determines whether or not an angle formed between an entry direction of the dump truck M2 into the output determination region A1 stored in the region storage unit 201 and an angle indicated by the azimuth data is lower than a predetermined angle (step S314). In a case where the angle formed between the two entry directions is lower than the predetermined angle (step S314: YES), the vehicle management device 10 executes the processes in step S17 and the subsequent steps shown in FIG. 10. On the other hand, in a case where the dump truck M2 has not entered the output determination region A1 (step S313: NO), or the angle formed between the two entry directions is equal to or higher than the predetermined angle (step S314: NO), the vehicle management device 10 finishes the information output process.

<<Advantageous Effect>>

As mentioned above, the vehicle management device 10 according to the fifth embodiment determines whether or not an entry direction of the dump truck M2 into the output determination region A1 is a predetermined direction on the basis of azimuth data in a case where the dump truck M2 is located in the output determination region A1. Consequently, the vehicle management device 10 according to the fifth embodiment can appropriately output information even in a case where there is another road with a different passage direction in the vicinity of a road including a location where the information is to be output, without setting the direction determination region A2.

Other Embodiments

As mentioned above, embodiments has been described with reference to the drawings, but a specific configuration is not limited to the above-described configurations, and various design changes may occur.

In the embodiments, a description has been made of a case where information is output on the basis of traveling of the dump truck M2, but this is only an example. For example, in other embodiments, information may be output on the basis of traveling of another vehicle.

In the embodiments, the vehicle management device 10 outputs notification information, outputs an instruction for updating a work amount, and outputs an instruction for updating a status on the basis of a position of the dump truck M2, but is not limited thereto. For example, the vehicle management device 10 may perform any one of output of notification information, output of an instruction for updating a work amount, and output of an instruction for updating a status, and may further output other information.

In the embodiments, the vehicle management device 10 determines whether or not information is required to be output on the basis of an entry direction into the output determination region A1 for all pieces of information, but is not limited thereto. For example, in other embodiments, it may be determined whether or not information is required to be output for some of the pieces of information on the basis of only entry into the output determination region A1 or the display region A3 (on the basis of typical determination of a geofence) regardless of an entry direction.

In the embodiments, an output determination location and a direction determination location are set as the regions A having a range such as the output determination region A1 and the direction determination region A2, but are not limited thereto. For example, in other embodiments, an output determination location and a direction determination location may be set as points. In this case, the vehicle management device 10 may determine whether or not the dump truck M2 is located at the output determination location on the basis of a position represented by position data of the dump truck M2 and a distance between the output determination location and the direction determination location.

In the vehicle management device 10 according to the embodiments, a description has been made of a case where the program is stored in the storage 300, but this is only an example. For example, in other embodiments, the program may be delivered to the vehicle management device 10 via a communication line. In this case, the vehicle management device 10 develops the delivered program to the main memory 200, and executes the processes.

The program may realize some of the functions. For example, the program may realize the functions through a combination with another program already stored in the storage 300 or a combination with another program installed in another device.

The vehicle management device 10 may include a programmable logic device (PLD) in addition to the configuration or instead of the configuration. Examples of the PLD may include a programmable array logic (PAL), a generic array logic (GAL), a complex programmable logic device (CPLD), and a field programmable gate array (FPGA). In this case, some of the functions realized by the processor 100 may be realized by the PLD.

INDUSTRIAL APPLICABILITY

The vehicle management device can appropriately output information even in a case where there is another road with a different passage direction in the vicinity of a road including a location where the information is to be output.

REFERENCE SIGNS LIST

10: VEHICLE MANAGEMENT DEVICE
101: REGION SETTING UNIT
102: POSITION RECEPTION UNIT
103: INSIDE-OUTSIDE DETERMINATION UNIT
104: ENTRY RECORDING UNIT
105: ENTRY DIRECTION DETERMINATION UNIT
106: NOTIFICATION INFORMATION OUTPUT UNIT
107: WORK AMOUNT RECORDING UNIT
108: STATUS RECORDING UNIT
109: POSITION RECORDING UNIT
110: AZIMUTH RECEPTION UNIT
201: REGION STORAGE UNIT
202: ENTRY STORAGE UNIT
203: WORK AMOUNT STORAGE UNIT
204: STATUS STORAGE UNIT
205: POSITION STORAGE UNIT
A1: OUTPUT DETERMINATION REGION
A2: DIRECTION DETERMINATION REGION
A3: DISPLAY REGION

The invention claimed is:

1. A vehicle management device for a construction site for which an operation is performed by a work machine and a transport vehicle, the vehicle management device comprising:
a region setting unit that sets a predetermined region or a predetermined point, a type of output in a case where the vehicle is located in the predetermined region or at the predetermined point, and predetermined information to be output, the type of output including at least one of an output to the work machine, an update of a work amount of the vehicle, and an update of a travel status of the vehicle;
an entry direction determination unit that determines whether or not an entry direction of the vehicle into the predetermined region or the predetermined point is a predetermined direction in a case where the vehicle is located in the predetermined region or at the predetermined point; and
an output unit that determines whether or not the predetermined information is to be output on the basis of a determination result in the entry direction determination unit.

2. A vehicle management device for a construction site for which an operation is performed by a work machine and a transport vehicle, the vehicle management device comprising:
a region setting unit that sets a direction determination region and an output determination region which is different from the direction determination region, a type of output in a case where the vehicle is located in the output determination region, and predetermined information to be output, the type of output including at least one of an output to the work machine, an update of a work amount of the vehicle, and an update of a travel status of the vehicle;
an entry recording unit that stores information indicating that a vehicle has entered a direction determination region into an entry storage unit in a case where the vehicle is located in the direction determination region;
an entry direction determination unit that determines that an entry direction of the vehicle into the output determination region is a predetermined direction in a case where the vehicle is located in the output determination region, and the entry storage unit stores the information indicating that the vehicle has entered the direction determination region; and
an output unit that determines whether or not the predetermined information is to be output on the basis of a determination result in the entry direction determination unit.

3. The vehicle management device according to claim 2, wherein the output determination region and the direction determination region are respectively circular regions having different center points or different diameters.

4. The vehicle management device according to claim 2, wherein the output determination region and the direction determination region are respectively fan-shaped regions having a common center point.

5. The vehicle management device according to claim 2, wherein the output determination region is a region including a location on a line segment connecting the center point of the direction determination region to a destination of the vehicle.

6. The vehicle management device according to claim 1, further comprising:
a position recording unit that stores position data of the vehicle into a position storage unit in association with an acquisition time of the position data,
wherein the entry direction determination unit determines whether or not an entry direction of the vehicle into the predetermined region or the predetermined point is the predetermined direction on the basis of the position data stored in the position storage unit in a case where the vehicle is located in the predetermined region or at the predetermined point.

7. The vehicle management device according to claim 2, wherein the output unit outputs the predetermined information on the basis of whether or not the entry direction is the predetermined direction in a case where a time point at which the vehicle is located in the output determination region is included in a predetermined time period.

8. A vehicle management method for a construction site for which an operation is performed by a work machine and a transport vehicle, the method comprising the steps of:
setting a predetermined region or a predetermined point, a type of output in a case where the vehicle is located in the predetermined region or at the predetermined point, and predetermined information to be output, the type of output including at least one of an output to the work machine, an update of a work amount of the vehicle, and an update of a travel status of the vehicle;
determining whether or not an entry direction of the vehicle into the predetermined region or the predetermined point is a predetermined direction in a case where the vehicle is located in the predetermined region or at the predetermined point; and
outputting the predetermined information on the basis of a determination result of whether or not the entry direction is the predetermined direction.

9. The vehicle management method according to claim 8, further comprising the step of:
storing information indicating that the vehicle has entered a predetermined position determination region which is different from an output determination region which is the predetermined region,
wherein, in the determining of whether or not the entry direction is the predetermined direction, an entry direction of the vehicle into the output determination region is determined as being the predetermined direction in a case where the vehicle is located in the output determination region, and the information indicating that the vehicle has entered the direction determination region is stored.

10. A non-transitory computer readable medium storing a computer program, which when executed by a computer, implements a vehicle management process for a construction site for which an operation is performed by a work machine and a transport vehicle comprising the steps of:
setting a predetermined region or a predetermined point, a type of output in a case where the vehicle is located in the predetermined region or at the predetermined point, and predetermined information to be output, the type of output including at least one of an output to the work machine, an update of a work amount of the vehicle, and an update of a travel status of the vehicle;
determining whether or not an entry direction of the vehicle into the predetermined region or the predetermined point is a predetermined direction in a case where the vehicle is located in the predetermined region or at the predetermined point; and
outputting the predetermined information on the basis of a determination result of whether or not the entry direction is the predetermined direction.

11. The non-transitory computer readable medium according to claim 10, wherein the steps further comprise:
storing information indicating that the vehicle has entered a predetermined position determination region which is different from an output determination region which is the predetermined region,
wherein, in the determining of whether or not the entry direction is the predetermined direction, an entry direction of the vehicle into the output determination region is determined as being the predetermined direction in a case where the vehicle is located in the output determination region, and the information indicating that the vehicle has entered the direction determination region is stored.

12. The vehicle management device according to claim 3, wherein the output unit outputs the predetermined information on the basis of whether or not the entry direction is the predetermined direction in a case where a time point at which the vehicle is located in the output determination region is included in a predetermined time period.

13. The vehicle management device according to claim 4, wherein the output unit outputs the predetermined information on the basis of whether or not the entry direction is the predetermined direction in a case where a time point at which the vehicle is located in the output determination region is included in a predetermined time period.

14. The vehicle management device according to claim 5, wherein the output unit outputs the predetermined information on the basis of whether or not the entry direction is the predetermined direction in a case where a time point at which the vehicle is located in the output determination region is included in a predetermined time period.

15. The vehicle management device according to claim 1, wherein the output unit determines whether or not the predetermined information is to be output to the work machine on the basis of the determination result in the entry direction determination unit.

16. The vehicle management method according to claim 8,
wherein the outputting the predetermined information includes outputting the predetermined information to the work machine on the basis of the determination result in the entry direction determination unit.

17. The non-transitory computer readable medium according to claim 10,
wherein the outputting the predetermined information includes outputting the predetermined information to the work machine on the basis of the determination result in the entry direction determination unit.

* * * * *